Patented July 11, 1950

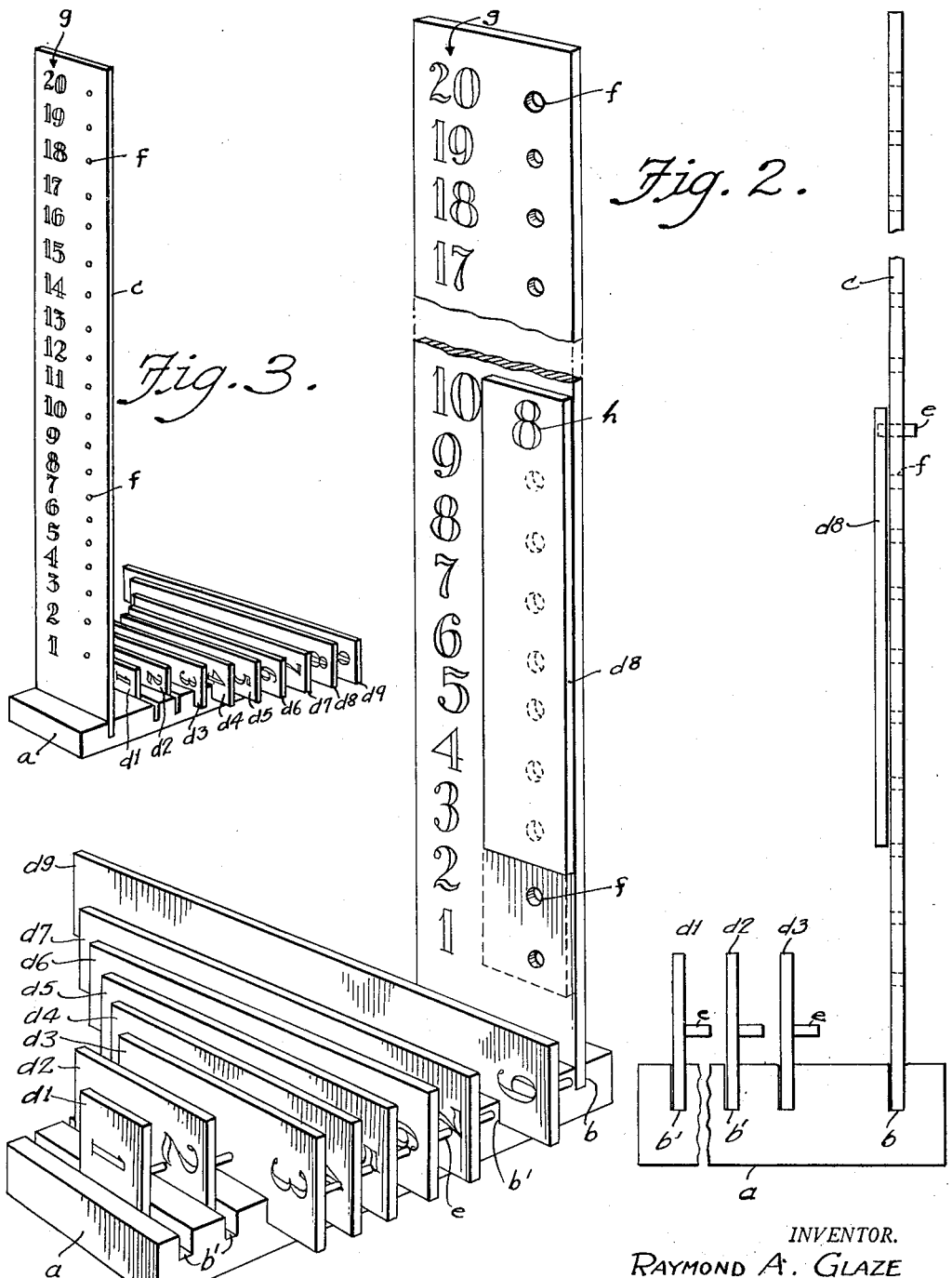

2,514,636

UNITED STATES PATENT OFFICE 2,514,636

VISUAL ARITHMETIC TEACHING APPARATUS

Raymond A. Glaze, Glendora, Calif.

Application December 9, 1948, Serial No. 64,369

6 Claims. (Cl. 35—31)

This invention relates to educational devices, particularly to devices for the purpose of teaching arithmetic to children. The primary object of the invention is to provide a device by means of which the arithmetical processes of addition and subtraction can be made visually apparent to a pupil in such a manner as to make the process more readily understandable to the pupil than is possible with present methods of teaching. The invention aims particularly at making the significance of numbers, their sums and differences, apparent to the pupil in terms of actual magnitudes. This is brought about by associating each of the primary digits, 1 to 9 inclusive, with a physical object having an actual size corresponding to the magnitude of the particular digits, whereby the values of the various digits can be readily appreciated by the pupil.

An important object of my invention is to provide a system and apparatus which will teach addition and subtraction in such a way as to eliminate the common practice of counting during the addition or subtraction process. For example, it is common for a young child in adding numbers together to start with the first number and then count up to the second number on the fingers of one hand or by making dots on a sheet of paper with a pencil. The invention aims to discourage this practice and to provide a system which will enable the child to immediately jump to the sum of two numbers without any intervening counting process.

More specifically, an object of the invention is to provide a system and apparatus by means of which the several primary numbers, 1 to 9 inclusive, each associated with a physical member of a size which will visually designate the magnitude of the particular number, may be detachably associated with a scale which bears a series of numbers designating sums, in such a manner that the sum of or difference between two numbers may be immediately grasped by the pupil in terms of the magnitudes of both the additive numbers and the sum of their addition.

A further object is to provide such a system and apparatus which may be readily manipulated by a very young child. Another object is to provide such a system and apparatus which is designed to stimulate the interest of a young pupil by appealing to his play instinct and giving pleasure to the child in manipulating the apparatus.

Other objects will become apparent in the ensuing specifications and appended drawings in which:

Fig. 1 is a perspective view of a set of apparatus embodying my invention;

Fig. 2 is a side view of the same; and

Fig. 3 is a perspective view of the apparatus used in a manner slightly different from that depicted in Fig. 1.

The invention utilizes the concept of providing apparatus by means of which a child may choose from a series of single number-bearing members arranged before him in such a manner that the numbers which they bear are all plainly visible, and their relation to each other, in terms of the magnitudes of such numbers, is at the same time, clearly made apparent. The members that are selected are then picked up and hung, as pendants, upon a vertical supporting post which bears a column of consecutive numbers, arranged in equal spacing which is related to the respective lengths of the single number bearing members. The manipulation involved in selecting the single number bearing members, picking them up, and hanging them on the supporting post, stimulates the interest of the child.

The apparatus of my invention utilizes a base $a$ having a transverse notch $b$ at one end and a series of transverse notches $b'$ distributed throughout the remainder of its length. The supporting post, shown at $c$, is in the form of a flat slab the lower end of which may be inserted in the notch $b$ so that the post may be supported in an upstanding position at the one end of base $a$.

The single-number-bearing members $d1$, $d2$, $d3$, $d4$, $d5$, $d6$, $d7$, $d8$ and $d9$ are also shown in the form of flat slabs. This is the preferred form for these members, since it enables them to be hung on the post $c$ and to lie flatly against the forward face thereof. These members will be referred to as pendants, being each provided at its upper end with means, preferably in the form of a peg $e$, for hanging it on the post $c$ by insertion of the peg into one of a series of openings $f$ in the post. The post $c$ bears a series of numbers 1, 2, 3, 4, 5, 6, 7, 8, 9, 10, 11, 12, 13, 14, 15, 16, 17, 18, 19 and 20 arranged in a column $g$ and designating sums or differences. The pendants $d1$, $d2$, etc. bear indicia $h$ consisting in the numerals 1–9 inclusive, each pendant bearing one of such numerals at its upper end. These numerals indicate numbers that are to be added or subtracted. The pendants $d1$, $d2$, etc. are all of the same width (preferably) but their length varies in accordance with the numerals $h$ which they bear. For example, the pendant $d1$, representing unity, and bearing the numeral 1, has a length representing a single unit of length of which the lengths of the other pendants d2, d3, etc. are multiples. The pendant d2, representing the numeral 2, has a length twice that of the pendant d1. The pendant d3, representing the numeral 3, has a length three times that of the pendant d1. Correspondingly, the pendants d4, d5, d6, d7, d8 and d9, representing the numerals 4, 5, 6, 7, 8 and 9 respectively, have lengths which are multiples of the length of pendant d1 in proportion to the numerals which they bear.

The numerals in the column g of post c are spaced apart so that the distance between each consecutive pair of these numerals is the same as the unit length of pendant d1. Consequently, the distance between any two numerals of the column g will exactly equal the difference between the larger and the smaller of these two numerals, as represented by the corresponding multiple of the unit length of pendant d1. Also, the distance from the numeral 1 at the bottom of column g up to any selected higher numeral, will equal the sum of the distances represented by any two selected groups of these numerals beginning at the bottom of column g. All such differences or sums will be in terms of the unit lengths measured by the length of pendant d1.

The column g of numerals is disposed along one side of the post c. Along the other side of the post c there is arranged a straight row of openings f, equidistantly spaced apart with a spacing corresponding to the unit length determined by the length of pendant d1, and each arranged opposite a corresponding numeral of the column g.

The post c is preferably made somewhat thicker than the pendants d1, d2, etc. and the slot b is correspondingly made somewhat wider than the slots b1, so that the post c can be inserted only in the slot b. This is not an essential feature of the invention, but is desirable for the purpose of assisting in keeping each of the slab members in its respective slot, and thus in a desirable order in which the pendants d1, d2, etc. are arranged in consecutive order with the pendant d1 preferably at the forward end of the base 3, immediately behind post c as shown in Fig. 3, and the pendant d9 at the rear end of the base. As an alternative arrangement, the post c may be arranged at the rear and the pendants d1, d2, etc. in front of the post, as shown in Fig. 1.

The basis for individualizing the pendants is through their obvious differences in length. These differences in length are associated in the child's mind with the different numerals appearing thereon at h, and the child, in learning these numerals, associates each one properly with its particular magnitude. Thus, instead of merely learning the numerals 1–9 inclusive by reciting them in an order of rotation, the pupil quickly grasps the fact that the numeral 1 designates a minimum or unit quantity, while the succeeding numerals 2, 3, 4, 5, etc. designate consecutively and uniformly increasing magnitudes.

In the use of the apparatus, the pendants d1, d2, etc. are selectively hung upon the post c by inserting the pegs e into selected openings f. With a particular pendant thus supported on the post c, the numeral appearing at h at its upper end will be disposed directly opposite a corresponding numeral in the column g. In the column g, the numeral immediately below the lower end of the pendant will then indicate the difference between the numeral opposite the upper end of the pendant and the numeral carried by the pendant itself. For example, where the pendant d8 (representing the numeral 8 which it bears) is hung in the hole f opposite numeral 10 in column g, the numeral 2 immediately below the level of the lower end of pendant d8, in column g, indicates the difference between 10 and 8 (10—8 equals 2) while the numeral 10 opposite the upper end of pendant d8 indicates the sum of the numeral 2 in column g and the numeral 8 borne by pendant d8. In teaching the addition process to the pupil, the teacher explains to the pupil that the numeral immediately below the level of the lower end of the pendant may be added to the numeral borne by the upper end of the pendant to produce the sum appearing in column g immediately opposite. The teacher explains to the pupil that the sum of the numeral 2 of column g and the numeral 8 of pendant d8 may be obtained by reading the numeral 10 immediately after the numeral 8 at the upper end of pendant d8. In teaching subtraction, the teacher explains to the pupil that by subtracting numeral 8 at the upper end of pendant d8 from numeral 10 appearing immediately opposite it, the difference represented by numeral 2 in column g will be obtained.

These processes are made visually understandable to the pupil by reference to the relative lengths of the pendants c. For the process of addition, two of the pendants are hung alongside the column g, one immediately above the other, and with the bottom of the lower one registering with the bottom of the column g. For example, for the addition of 2 to 8, the pendant d2, bearing the numeral 2, would be hung immediately below the pendant d8 shown suspended on the post c in Fig. 1. (It would then become immediately apparent to the child that the small number 2 was being added to the larger number 8, because of the end to end arrangement of the pendants d2 and d8. It also would be visually apparent to the child that the sum of these two would be represented by the numeral 10 of column g, and that the numeral 10 represented a quantity equalling the combined lengths of the pendants d2 and d8, arranged end to end.) For the subtraction process, it would be apparent to the child that the pendant d8, hung by itself with its upper end opposite the numeral 10 of column g, as shown in Fig. 1, could be subtracted from the quantity 10 to leave the remainder 2 represented by the vacancy between its lower end and the bottom of column g; and also represented by the numeral 2 at the top of that vacant space.

In the event it is desired to represent the addition of three numbers together, the three corresponding pendants are simply arranged end to end with the lower one having its lower end opposite the lower end of column g.

While the post c is illustrated as bearing numerals in the column g only up to the numeral 20, it is to be understood of course that it may be made longer and bear a correspondingly higher number of numerals. For example, the numerals in column 20 might run up to the total sum of the numerals borne by pendants d1–d9 respectively, i. e. up to 45.

An important advantage of the apparatus of my invention is the fact that the child will, in using it, arrive at sums of addition and differences of subtraction by a direct mental process of associating the respective numbers involved with their respective magnitudes as visually represented by the various linear distances and length embodied in post c and pendants d1, d2, etc., and will avoid the objectionable processes of counting on fingers or applying a series of dots to a piece of paper, or other counting processes.

I claim:

1. Visual arithmetic teaching apparatus comprising a rectangular base having therein ten transverse upwardly opening, parallel side slots, a plurality of flat slabs comprising a number of pendants bearing the numerals 1-9 inclusive and of lengths corresponding respectively to the magnitudes designated by the numerals that they bear, and a post the lower end of which is adapted to be supported in one of said slots, said post having a face bearing along one side thereof a vertical column of numerals beginning with the numeral 1 near the lower end of the post and projecting upwardly in arithmetical sequence to a top numeral larger in magnitude than the numeral 9, said face having on the other side thereof a blank space extending from top to bottom thereof and also having, along said blank space, a series of devices for supporting said pendants, said devices being arranged opposite the respective numerals of said vertical column, the spacing of said devices being exactly the same as the unit length represented by the shortest of said pendants, and said pendants being provided with means cooperable with said devices to support said pendants upon said post against said blank space with respective ends of said pendants disposed opposite respective numerals in said column and cooperable therewith to indicate sums and differences on said column.

2. Visual arithmetic teaching apparatus comprising a plurality of pendants bearing the numerals 1 to 9 inclusive and of lengths corresponding respectively to the magnitudes designated by the numerals that they bear, and a post having means for supporting the same in an upright position, said post having a face bearing along one side thereof a vertical column of numerals beginning with the numeral 1 near the lower end of the post and projecting upwardly in arithmetical sequence to a top numeral larger in magnitude than the numeral 9, said face having on the other side thereof a blank space extending from top to bottom thereof and also having along said blank space, a series of devices for supporting said pendants, said devices being arranged opposite the respective numerals of said vertical column, the spacing of said devices being exactly the same as the unit length represented by the shortest of said pendants, and said pendants being provided with means cooperable with said devices to support said pendants upon said post against said blank space with respective ends of said pendants disposed opposite respective numerals in said column and cooperable therewith to indicate sums and differences on said column.

3. Apparatus as defined in claim 2, in which said supporting devices and cooperable means comprise openings in the post in said blank space and pegs on the upper ends of said pendants, receivable in said openings.

4. Visual arithmetic teaching apparatus comprising a plurality of rectangular members bearing the numerals 1 to 9 inclusive and of lengths corresponding respectively to the magnitudes designated by the numerals that they bear, and a post having means for supporting the same in an upright position, said post having a face bearing along one side thereof a vertical column of numerals beginning with the numeral 1 and extending vertically in arithmetical sequence to a terminal numeral larger in magnitude than the numeral 9, said face having on the other side thereof a blank space extending from top to bottom thereof and also having, along said blank space, a series of devices for supporting said rectangular members, said devices being arranged opposite the respective numerals of said vertical column, the spacing of said devices being exactly the same as the unit length represented by the shortest of said rectangular members, and said rectangular members being provided with means cooperable with said devices to support said rectangular members upon said post against said blank space with respective ends of said rectangular members disposed opposite respective numerals in said column and cooperable therewith to indicate sums and differences on said column.

5. Visual arithmetic teaching apparatus comprising a plurality of rectangular members bearing the numerals 1 to 9 inclusive and of lengths corresponding respectively to the magnitudes designated by the numerals that they bear, and a post having means for supporting the same in an upright position, said post having a face bearing along one side thereof a vertical column of numerals beginning with the numeral 1 and extending vertically in arithmetical sequence to a terminal numeral larger in magnitude than the numeral 9, said face having on the other side thereof a blank space extending from top to bottom thereof and also having, along said blank space, a series of devices for supporting said rectangular members, the spacing of said devices being exactly the same as the unit length represented by the shortest of said rectangular members, and said rectangular members being provided with means cooperable with said devices to support said rectangular members upon said post against said blank space with respective ends of said rectangular members disposed opposite respective numerals in said column and cooperable therewith to indicate sums and differences on said column.

6. Apparatus as defined in claim 5, wherein the numerals on said rectangular members are disposed at respective ends thereof, in positions to register with numerals of said column when said rectangular members are supported by said devices.

RAYMOND A. GLAZE.

REFERENCES CITED

The following references are of record in the file of this patent:

UNITED STATES PATENTS

| Number | Name | Date |
|---|---|---|
| 183,335 | Sitterley | Oct. 17, 1876 |
| 805,365 | Knappe | Nov. 21, 1905 |
| 1,151,279 | Lewis | Aug. 24, 1915 |
| 1,471,437 | Wood | Oct. 23, 1923 |
| 1,560,994 | Jones | Nov. 10, 1925 |
| 1,573,358 | Ross | Feb. 16, 1926 |
| 1,594,376 | Passmore | Aug. 3, 1926 |
| 1,950,072 | Townsend | Mar. 6, 1934 |

FOREIGN PATENTS

| Number | Country | Date |
|---|---|---|
| 265,451 | Germany | Oct. 8, 1913 |
| 321,251 | France | May 20, 1902 |